Figures 1, 2:
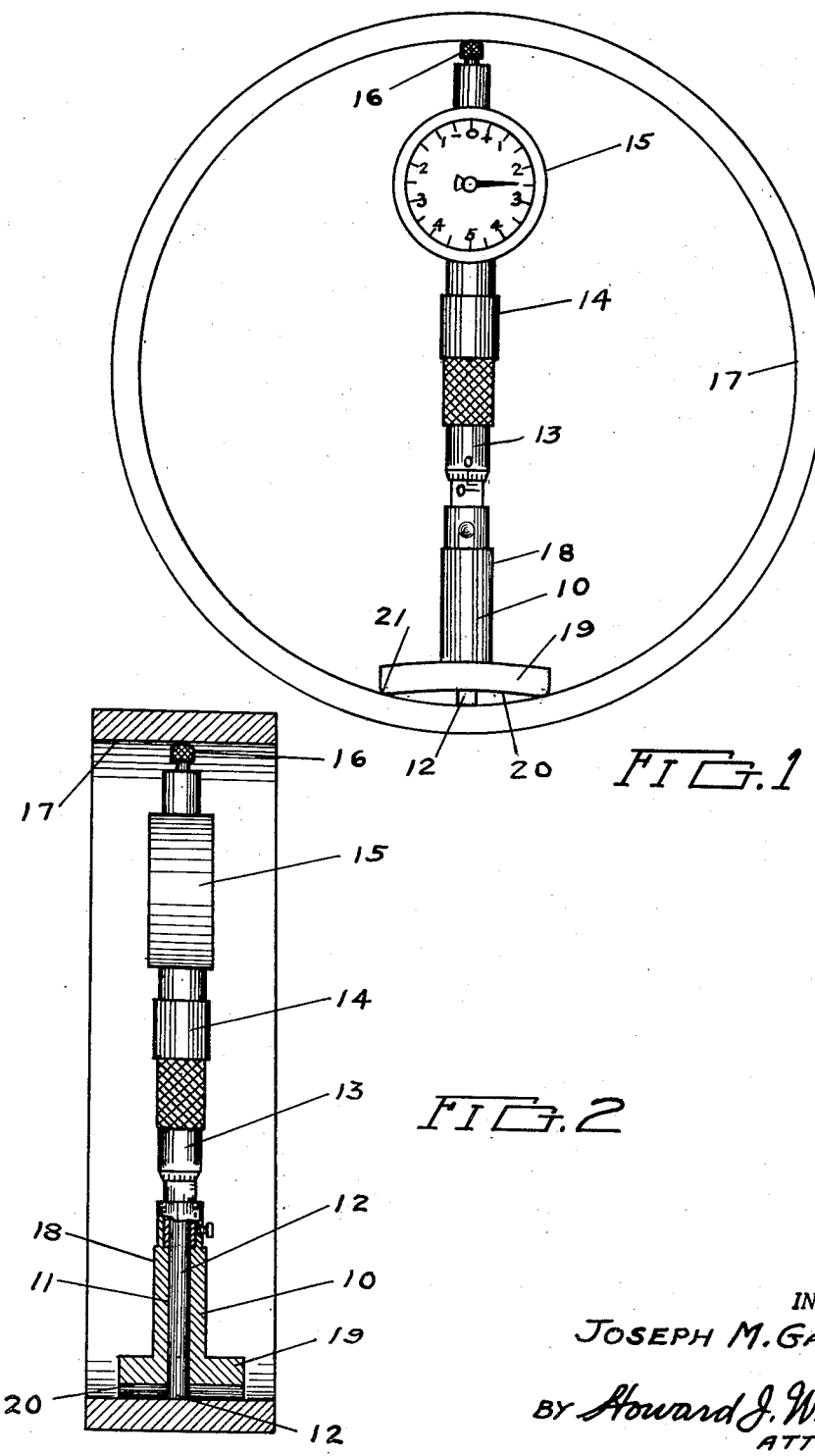

Nov. 2, 1954  J. M. GARRETT  2,693,036
SELF-CENTERING INSIDE DIAMETER GAUGE
Filed July 2, 1952

INVENTOR.
JOSEPH M. GARRETT.
BY Howard J. Whelan.
ATTORNEY.

2,693,036

SELF-CENTERING INSIDE DIAMETER GAUGE

Joseph M. Garrett, Baltimore, Md.

Application July 2, 1952, Serial No. 296,896

1 Claim. (Cl. 33—178)

This invention relates to a non-mechanical centralizer and more particularly to an attachment for use with internal micrometers and indicators to enable them to be automatically positioned on the center axis of holes to be measured and produce a true measurement along the center axis of the hole.

It is an object of this invention to provide a new and improved attachment for use with an inside micrometer and/or indicator to locate and hold it on the center axis of the hole during measurement, to produce an accurate measurement of the hole taken on its center axis.

It is a further object of this invention to provide an attachment to slide over the stem of an inside micrometer or an indicator and automatically align the measuring device on the center axis of the hole to be measured.

It is an additional object of this invention to provide a centralizer for sliding over the stem of an inside micrometer or indicator to automatically place the center axis of the measuring instrument on the center axis of the hole being measured, without interfering with the movement of the rotatable stem of the instrument.

It is an additional object of this invention to provide an inside micrometer and indicator slidably mounted in an automatic centralizer to align the center axis of the measuring devices on the center line of the hole measured and to eliminate the human element of too tight or too loose a "feel" when measuring internal screw threads and holes.

Other objects will become apparent as the invention is more fully set forth.

For a clearer understanding of the invention and the objects thereof, reference is made to the accompanying drawings, wherein a particular form of the invention is indicated. These drawings when used in conjunction with the following description serve to illustrate the invention, its principles and the operation thereof, while the claims indicate the scope thereof.

In the drawings:

Figure 1 is a front elevation of the self aligning centralizer and measuring instrument; embodying this invention, located in a hole to be measured; and Figure 2 is a side elevation of Figure 1, with parts broken away to show its inner construction.

Similar reference characters refer to similar parts throughout the drawings.

In the construction shown in the drawings a centralizer 10 is provided with a hole 11 to slidably fit over the stem 12 of an inside micrometer 13. The inside micrometer is attached by a collar 14 to an indicator 15 having a feeler 16 for contacting the walls of the hole or cylindrical opening 17 to be measured. The centralizer 10 comprises an upright support 18 with the hole 11, is mounted on a base 19 having a curved under surface 20 with turned up edges 21, providing two parallel lines of contact with the internal wall of the cylindrical opening 17, to slidably contact the wall of the hole 17 to be measured and align the centralizer and its measuring instruments along the central axis of the hole being measured. Although the centralizer is shown in the drawings attached to an inside micrometer and indicator, it is appreciated that the centralizer can be used with either the inside micrometer or the indicator separately and will automatically align the center line of either instrument on the center line of the bore of the hole to be measured.

While but one general form of the invention is shown in the drawings and described in the specification, it is not desired to limit this application for patent to this particular form as it is appreciated that other forms of construction could be made that would use the same principles and come within the scope of the appended claim.

Having thus described the invention, what is claimed is:

A measuring and centralizing device contacting the opposite walls of a cylindrical opening comprising a sleeve having an axial opening therethrough, a base, having parallel straight edges, at the lower end of the sleeve having an upper and a lower surface, said base having a central bore in alignment with the aforesaid axial opening, said upper surface being outwardly arcuate while the lower surface curves inwardly to provide two parallel lines of contact with the walls of the cylindrical opening, a stem slidable in the aforesaid axial opening and bore, said stem contacting the walls of the cylindrical opening at a point beneath and centrally of the lower curved surface, a micrometer device connected and in axial alignment with said stem, a dial indicator in axial alignment and connected with said micrometer device, and a feeler for said dial indicator in contact with the walls of the cylindrical opening at a point diametrically opposite to the point of contact between said stem and the walls of the opening.

References Cited in the file of this patent

UNITED STATES PATENTS

| Number | Name | Date |
|---|---|---|
| 302,069 | Waterman | July 15, 1884 |
| 1,653,854 | Hoge | Dec. 27, 1927 |
| 2,030,864 | Gielow | Feb. 18, 1936 |
| 2,542,030 | Hoppe | Feb. 20, 1951 |

FOREIGN PATENTS

| Number | Country | Date |
|---|---|---|
| 28,854 | Great Britain | Dec. 16, 1896 |
| 546,130 | Germany | Mar. 10, 1932 |
| 238,163 | Switzerland | Oct. 1, 1945 |